United States Patent
Bhatasana

(10) Patent No.: US 10,429,230 B2
(45) Date of Patent: Oct. 1, 2019

(54) SMALL FLOW CAPACITY DISPLACEMENT PROVER FOR PROVING FLOW METER WITH LARGE FLOW CAPACITY

(71) Applicant: Saudi Arabian Oil Company, Dhahran (SA)

(72) Inventor: Chandulal N. Bhatasana, Abqaiq (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 392 days.

(21) Appl. No.: 15/487,143

(22) Filed: Apr. 13, 2017

(65) Prior Publication Data

US 2018/0299320 A1 Oct. 18, 2018

(51) Int. Cl.
G01F 25/00 (2006.01)

(52) U.S. Cl.
CPC ...... *G01F 25/0007* (2013.01); *G01F 25/0015* (2013.01)

(58) Field of Classification Search
CPC .......................... G01F 25/0007; G01F 25/0015
See application file for complete search history.

(56) References Cited

U.S. PATENT DOCUMENTS

| | | |
|---|---|---|
| 2,772,561 A | 12/1956 | Plank |
| 3,423,988 A | 1/1969 | Grove et al. |
| 5,072,416 A | 12/1991 | Francisco, Jr. et al. |
| 6,360,579 B1 | 3/2002 | De Boom et al. |
| 7,028,528 B2 | 4/2006 | Antonijevic |
| 9,175,810 B2 | 11/2015 | Hains et al. |
| 9,500,508 B2 | 11/2016 | Gotou et al. |
| 2013/0179374 A1 | 7/2013 | Hains et al. |

FOREIGN PATENT DOCUMENTS

| | | |
|---|---|---|
| EP | 2660570 A2 | 11/2013 |
| GB | 2088566 A | 6/1982 |
| JP | H11287676 A | 10/1999 |
| JP | 2000249619 A | 9/2000 |
| JP | 2014211375 A | 11/2014 |
| WO | 2016059132 A1 | 4/2016 |

OTHER PUBLICATIONS

Hayward, A. T. J., "How to calibrate flowmeters and velocity meters" R. Loxton et al. (eds.), Instrumentation: A Reader, Chapman & Hall 1990. (Year: 1990).*
International Search Report and Written Opinion for International Application No. PCT/US2018/027499, dated Aug. 10, 2018 (pp. 1-16).

* cited by examiner

*Primary Examiner* — Paul M. West
(74) *Attorney, Agent, or Firm* — Bracewell LLP; Constance G. Rhebergen; Linda L. Morgan

(57) ABSTRACT

A method for verifying the accuracy of a custody meter having a custody flow capacity with a displacement prover having a prover flow capacity includes providing a first master flow meter and a second master flow meter operating in parallel. The displacement prover is in series with the master flow meters and has a prover flow capacity that is less than the custody flow capacity. A fluid flow is diverted through the custody meter so that a portion of the fluid flow passes through each of the master flow meters. Each of the master flow meters are proved individually with the displacement prover. The custody meter is proved with both of the master flow meters operating simultaneously in parallel.

20 Claims, 4 Drawing Sheets

SMALL FLOW CAPACITY DISPLACEMENT PROVER FOR PROVING FLOW METER WITH LARGE FLOW CAPACITY

BACKGROUND

1. Field of the Disclosure

The present disclosure relates in general to displacement provers used to verify the accuracy of flow meters, and more particularly to using smaller flow capacity displacement provers for proving a flow meter with a larger flow capacity.

2. Description of the Related Art

In typical pipeline systems that transport various liquid hydrocarbon, for example at marine terminals where liquid hydrocarbon is loaded onto vessels as cargo, it is important to measure the flow of hydrocarbons accurately as ownership of the hydrocarbon commodity changes and a dollar value is assigned to the volume of hydrocarbon. The accuracy of the flow meter, which can be known as a custody meter, used to measure the volume of the hydrocarbon, such as turbine meter, positive displacement meter, liquid ultrasonic meter, or other known metering device, can be affected by a variation in characteristic of fluid to be measured, changes in operating process conditions, life cycle of the flow meter, and other external conditions. A meter prover can be used to check the accuracy of the flow meter by deriving a meter factor. When the meter proving system is being operated, the entire flow of fluids from the custody transfer flow meter is diverted through the prover.

Meter proving systems in the U.S. and internationally, in general, can be guided by The American Petroleum Institute Manual of Petroleum Measurement Standards, Chapter 4—Proving Systems, Section 2, Displacement Provers, Third Edition, September 2003, Reaffirmed—March 2011 (hereafter this standard shall be referred as API MPMS Chap 4.2). Meter proving using a displacement type of prover is approved as per this API Standard.

A typical displacement prover has a length of pipe through which the displacer travels back and forth, actuating a detector at each end of the calibrated section. The prover computer starts totalizing the fluid flow when the displacer passes through the detecting point at one end of the calibration section and stops totalizing when the displacer passes through the detector at the other end of the calibration section. The flow meter reading for the time required for the displacer to travel between the detecting points is also determined. The reading from the flow meter is then compared with the known volume of the metering pipe between the detecting points of the displacement prover to provide accurate calibration meter factor.

Per the guideline in API MPMS Chap 4.2, the size (volume) of the displacement prover should be such that 10000 pulses from the flow meter could be accommodated during each proving pass. As all the quantity of fluid flowing through the flow meter also flows through the displacement prover, the flow capacity of the displacement prover should be same or bigger than the flow meter to be proven, if the displacement prover size is derived per guideline in API MPMS Chap 4.2.

API MPMS chap 4.6 provides a method of pulse interpolation by which the volume of the prover can be reduced. By using the pulse interpolation method, less than 10000 pulses are required to be accumulated. However, the flow capacity of displacement prover should still be the same or bigger than the flow meter to be proved.

The flow capacity and volume of the displacement prover depends on the K-factor and flow rate of the flow meter to be proved. In some systems, a high flow rate of the flow meter becomes the limitation in reducing the size of the displacement prover. For example, some metering systems, such as custody metering systems at marine loading terminals, have flow meters which are of very high flow capacity. Due to such very high flow capacity, the displacement prover to prove flow meters are very large. The sheer size of such provers make them difficult to operate and maintain and they are not readily available for purchase. In addition, metering systems can be located in areas with limited space, such as on a platform that cannot accommodate a prover that is of a suitable size to prove the desired flow meters at the full flow rate of the desired flow meters.

SUMMARY OF THE DISCLOSURE

Embodiments of this disclosure provide systems and methods for using a smaller size of proving apparatus to prove the accuracy of fluid flow meters. Using multiple master meters in parallel to perform direct master meter proving allows for a reduced flow capacity displacement prover, the reduction in flow capacity being proportional to the number of master meters utilized. Each master meter can be proved using the displacement prover and then each custody flow meter can be proved by operating multiple master meters in parallel to handle the desired flow rate of the custody flow meter.

In an embodiment of this disclosure, a method for verifying the accuracy of a first custody meter having a first custody flow capacity with a displacement prover having a prover flow capacity includes providing a first master flow meter and a second master flow meter, the first master flow meter and the second master flow meter each being arranged in series with the first custody meter and the first master flow meter being arranged in parallel with the second master flow meter. The displacement prover is in series with the first master flow meter and the second master flow meter. The prover flow capacity is less than the first custody flow capacity. A fluid flow through the first custody meter is diverted so that a portion of the fluid flow passes through each of the first master flow meter and the second master flow meter. Each of the first master flow meter and the second master flow meter are proved individually with the displacement prover. The first custody meter is proved with both of the first master flow meter and the second master flow meter simultaneously.

In alternate embodiments, a first custody meter factor can be determined by dividing a sum total of the fluid flow measured by the first master flow meter and the second master flow meter, by the fluid flow measured by the first custody meter. A second custody meter with a second custody flow capacity that is greater than the prover flow capacity, and a third custody meter with a third custody flow capacity that is greater than the prover flow capacity can be provided. The second custody meter can be proved with both of the first master flow meter and the second master flow meter simultaneously. The third custody meter can be proved with both of the first master flow meter and the second master flow meter simultaneously.

In other alternate embodiments, each of the first master flow meter and the second master flow meter can be proved at a plurality of selected flow rates, and the first custody meter can be proved at the plurality of selected flow rates.

Proving the first master flow meter can include controlling a rate of flow through the first master flow meter with a prover flow control valve located in series with the first master flow meter and the second master flow meter. Proving the first custody meter can include controlling a rate of flow through the first custody meter with a master meter flow control valve located in series with the first master flow meter and the second master flow meter.

In an alternate embodiment of this disclosure, a method for verifying the accuracy of a plurality of custody meters with a displacement prover includes providing a metering skid having the plurality of custody meters operating in parallel, each of the plurality of custody meters having a custody meter flow capacity. A master meter bank having a plurality of master flow meters is provided, the plurality of master flow meters operating in parallel and being arranged in series with the plurality of custody meters. The displacement prover is in series with the plurality of master flow meters. A prover flow capacity is less than the custody meter flow capacity of each of the plurality of custody meters. Prover takeoff valves are operated to divert a fluid flow from a selected custody meter of the plurality of custody meters to the master meter bank and direct the fluid flow from the other of the plurality of custody meters to an outlet, wherein the fluid flow from the selected custody meter passes through two or more selected master flow meters of the plurality of master flow meters. Each of the selected master flow meters is proved individually with the displacement prover. The selected custody meter is proved with a combination of the selected master flow meters simultaneously.

In alternate embodiments, prover takeoff valves can be operated to prove another custody meter of the plurality of custody meters with the combination of the selected master flow meters simultaneously. Master valves located in series with the plurality of master flow meters can be operated to switch fluid flow from each of the plurality of master flow meters between the outlet and the displacement prover.

In other alternate embodiments, proving each of the selected master flow meters can include controlling a rate of flow through the each of the selected master flow meters with a prover flow control valve located in series with each of the plurality of master flow meters. Proving the selected custody meter can include controlling a rate of flow through the selected custody meter with a master meter flow control valve located in series with each of the plurality of master flow meters. The method can further include determining a master meter factor of each of the selected master flow meters by dividing the fluid flow measured by the displacement prover, by the fluid flow measured each of the selected master flow meters individually, and determining a custody meter factor of the selected custody meter by dividing a sum total of the fluid flow measured by all of the selected master flow meters, by the fluid flow measured by the selected custody meter.

In yet other alternate embodiments, the method can include providing a prover header located in series between the plurality of custody meters and the plurality of master flow meters, the prover header in fluid communication with each of the plurality of custody meters and each of the plurality of master flow meters.

In another alternate embodiment of this disclosure, a system for verifying the accuracy of a first custody meter having a first custody flow capacity with a displacement prover having a prover flow capacity includes a first master flow meter and a second master flow meter, the first master flow meter and the second master flow meter each being arranged in series with the first custody meter and the first master flow meter being arranged in parallel with the second master flow meter. The displacement prover is in series with the first master flow meter and the second master flow meter, wherein the prover flow capacity is less than the first custody flow capacity, the displacement prover operable to prove each of the first master flow meter and the second master flow meter individually. Prover takeoff valves are operable to divert a fluid flow from the first custody meter so that a portion of the fluid flow passes through each of the first master flow meter and the second master flow meter for proving the first custody meter with both of the first master flow meter and the second master flow meter simultaneously.

In alternate embodiments, the system can include a second custody meter with a second custody flow capacity that is greater than the prover flow capacity, and a third custody meter with a third custody flow capacity that is greater than the prover flow capacity. The prover takeoff valves can be operable to divert the fluid flow from the second custody meter so that a portion of the fluid flow passes through each of the first master flow meter and the second master flow meter for proving the second custody meter with both of the first master flow meter and the second master flow meter simultaneously. The prover takeoff valves can be operable to divert the fluid flow from the third custody meter so that a portion of the fluid flow passes through each of the first master flow meter and the second master flow meter for proving the third custody meter with both of the first master flow meter and the second master flow meter simultaneously.

In other alternate embodiments, the system can include a prover flow control valve located in series with the first master flow meter and the second master flow meter operable to control a rate of flow through the first master flow meter while proving the first master flow meter. A master meter flow control valve can be located in series with the first master flow meter and the second master flow meter and be operable to control a rate of flow through the first custody meter while proving the first custody meter. A metering skid can support the first custody meter and supporting additional custody flow meters. A master meter bank can have the first master flow meter and the second master flow meter. A prover header can be located in series between the first custody meter and the first master flow meter and the second master flow meter, the prover header in fluid communication with each of the first custody meter, the first master flow meter and the second master flow meter.

BRIEF DESCRIPTION OF THE DRAWINGS

So that the manner in which the above-recited features, aspects and advantages of the disclosure, as well as others that will become apparent, are attained and can be understood in detail, a more particular description of the embodiments of the disclosure briefly summarized above may be had by reference to the embodiments thereof that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION

The Specification, which includes the Summary of Disclosure, Brief Description of the Drawings and the Detailed Description, and the appended Claims refer to particular features (including process or method steps) of the disclosure. Those of skill in the art understand that the disclosure includes all possible combinations and uses of particular features described in the Specification. Those of skill in the art understand that the disclosure is not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this disclosure relates unless defined otherwise.

As used in the Specification and appended Claims, the singular forms "a", "an", and "the" include plural references unless the context clearly indicates otherwise. As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Spatial terms describe the relative position of an object or a group of objects relative to another object or group of objects. The spatial relationships apply along vertical and horizontal axes. Orientation and relational words including "uphole" and "downhole"; "above" and "below" and other like terms are for descriptive convenience and are not limiting unless otherwise indicated.

Where the Specification or the appended Claims provide a range of values, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the Specification and appended Claims to a method comprising two or more defined steps, the defined steps can be carried out in any order or simultaneously except where the context excludes that possibility.

Figure 1:
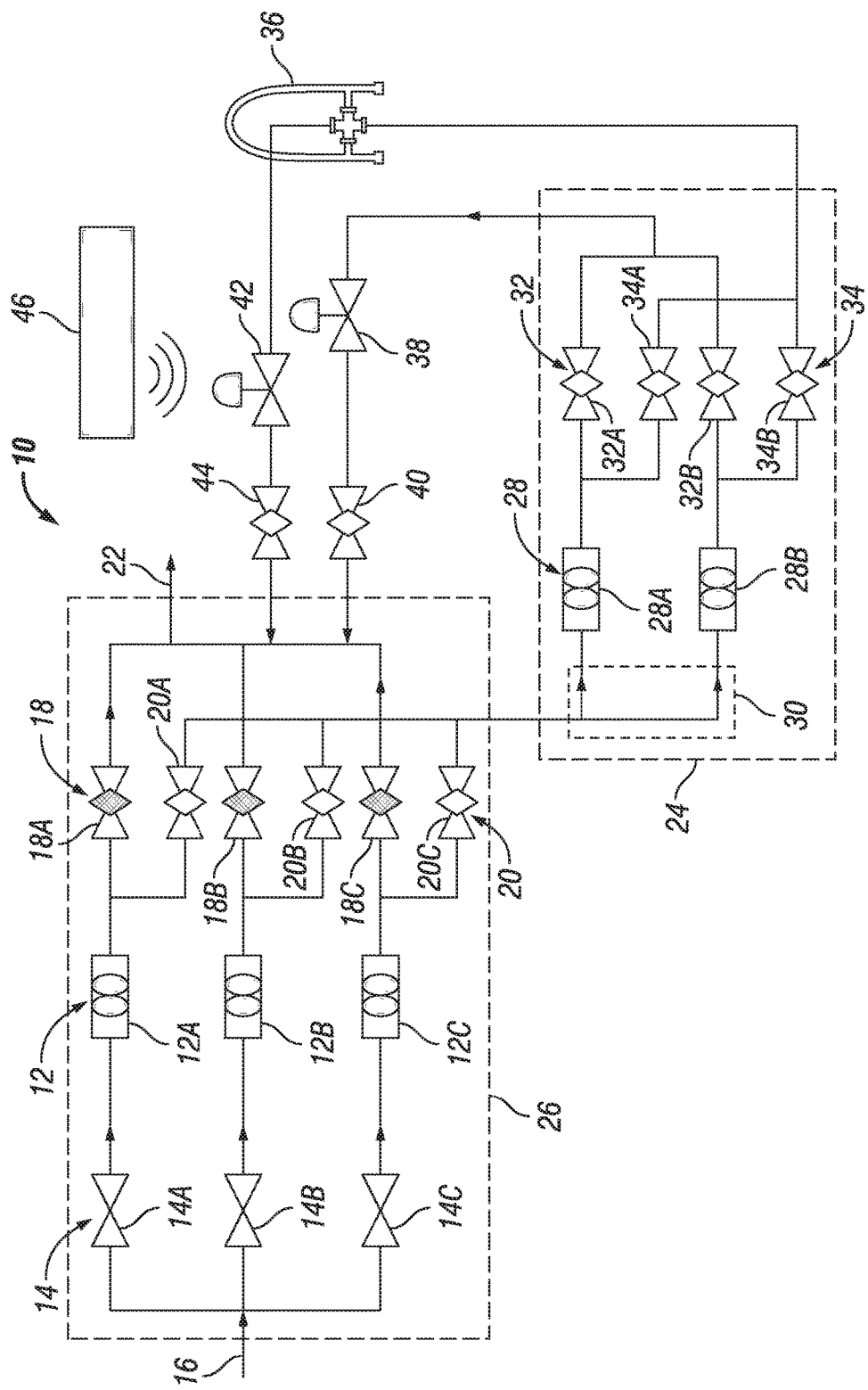
FIG. 1 is a schematic diagram of a system for verifying the accuracy of custody meters in accordance with an embodiment of this disclosure, shown with the valves operated for normal operation of a metering skid.

Looking at FIG. 1, metering system 10 is a system for custody transfer and accuracy of custody meters 12 to be verified. In the example embodiments, metering system 10 has three custody meters 12, which include first custody meter 12a, second custody meter 12b, and third custody meter 12c. In alternate embodiments, there can be as few as one custody meter 12 or more than three custody meters 12. Each custody meter has an associated custody flow capacity. Custody meters 12 can be of equal flow capacity or alternately, could have different flow capacities to meet at required meter skid flow rate turndown ratio.

Upstream of each of the custody meters 12 can be an inlet valve 14. Each custody meter 12 can be associated with and in fluid communication with a separate inlet valve 14. As an example, first inlet valve 14a can be upstream of first custody meter 12a, second inlet valve 14b can be upstream of second custody meter 12b, and third inlet valve 14c can be upstream of third custody meter 12c. Inlet valves 14 are downstream of, and in fluid communication with, inlet 16. Inlet valves 14 can be operated, that is moved between open and closed positions, to control the flow of fluids through inlet 16 to each of the custody meters 12.

Downstream of each custody meter 12 can be a flow control valve (not shown) for controlling the flow of fluid through each custody meter 12 on an individual basis. Downstream of each custody meter 12 can be an outlet valve 18. In certain embodiments, outlet valve 18 can be a double block and bleed style valve. Downstream of each custody meter 12 can also be a prover takeoff valve 20. In certain embodiments, prover takeoff valve 20 can be a double block and bleed style valve. Each custody meter 12 can be associated with and in fluid communication with a separate outlet valve 18 and a separate prover takeoff valve 20. As an example, first outlet valve 18a and first prover takeoff valve 20a can be downstream of first custody meter 12a, second outlet valve 18b and second prover takeoff valve 20b can be downstream of second custody meter 12b, and third outlet valve 18c and third prover takeoff valve 20c can be downstream of third custody meter 12c.

Note that in the examples of FIGS. 1-4, when the diamond shaped center portion of a schematic valve is filled in, it is an indication that such valve is in an open position. When the diamond shaped center portion of a schematic valve is empty, it is an indication that such valve is in a closed position.

When an outlet valve 18 is in an open position, fluid flowing through the associated custody meter 12 is directed to outlet 22. As an example, when first outlet valve 18a is in an open position, fluid flowing through first custody meter 12a is directed towards outlet 22. When prover takeoff valve 20 is in an open position, fluid flowing through the associated custody meter 12 is directed towards master meter bank 24 and through master flow meters 28 so that master flow meters 28 can prove the associated custody meter 12. As an example, when first prover takeoff valve 20a is in an open position, fluid flowing through first custody meter 12a is directed towards master meter bank 24, when second prover takeoff valve 20b is in an open position, fluid flowing through second custody meter 12b is directed towards master meter bank 24, and when third prover takeoff valve 20c is in an open position, fluid flowing through third custody meter 12c is directed towards master meter bank 24. Custody meters 12, inlet valves 14, outlet valves 18, and prover takeoff valves 20 can be supported by, and located on, metering skid 26.

Master meter bank 24 can include two or more master flow meters 28. In the example embodiments, master meter bank 24 includes first master flow meter 28a and second master flow meter 28b. In alternate embodiments, master meter bank 24 can include more than two master flow meters 28. Master flow meters 28 can be arranged in series with custody meters 12. Master flow meters 28 are shown arranged in parallel with each other. In alternate embodiments, master flow meters 28 flow lines between master flow meters 28 could be provided so that master flow meters 28 could be operated in series to prove all of the master flow meters 28 simultaneously, with the excess flow from the custody meters being routed to bypass the series of master flow meters 28.

Prover header 30 is located in series between custody meters 12 and master flow meters 28. Prover header 30 is in fluid communication with each of the custody meters 12 and the master flow meters 28 and can direct fluid flowing out of any of the custody meters 12 towards any of the master flow meters 28. Inlet isolation valves (not shown) can be located within or adjacent to prover header 30 for isolating fluid flow from any master flow meter 28. Because proving of master flow meters 28 is not a continuous operation, inlet isolation valves for the purpose of master meter maintenance can alternately be eliminated since the master meter bank 24 and displacement prover 36 could be isolated for maintenance through the closing of prover takeoff valves 20.

Each master flow meter 28 can have an associated master valves, including master outlet valve 32 and master prover valve 34, that are located in series with master flow meters 28. As an example, first master flow meter 28a is upstream of, and in fluid communication with, first master outlet valve 32a and first master prover valve 34a, and second master flow meter 28b is upstream of, and in fluid communication with, second master outlet valve 32b and second master prover valve 34b. Master outlet valve 32 and master prover valve 34 can be in a double block and bleed valve arrangement, be a three-port double block and bleed valve, a multiport valve, or in any other arrangement that allows for the connection of any master flow meter 28 to displacement prover 36 at any given time to prove such master flow meter 28.

When a master outlet valve 32 is in an open position, fluid flow through the associated master flow meter 28 can be directed towards outlet 22. As an example, when first master outlet valve 32a is in an open position, fluid flow through first master flow meter 28a can be directed towards outlet 22 and when second master outlet valve 32b is in an open position, fluid flow through second master flow meter 28b can be directed towards outlet 22.

When a master prover valve 34 is in an open position, fluid flow through the associated master flow meter 28 can be directed towards displacement prover 36. As an example, when first master prover valve 34a is in an open position, fluid flow through first master flow meter 28a can be directed towards displacement prover 36 and when second master prover valve 34b is in an open position, fluid flow through second master flow meter 28b can be directed towards displacement prover 36.

Displacement prover is located in series with master flow meters 28. Displacement prover 36 is located to directly prove each master flow meter 28 and has a prover flow capacity that is less than the custody flow capacity of each custody meter 12. The volume and flow capacity of displacement prover 36 shall be suitable to prove each master flow meter 28 individually. As the flow from the custody meters 12 stream is divided between multiple master flow meters 28, the flow rate requirement of displacement prover 36 is reduced proportionally by the number of master flow meters 28 used in parallel.

Master meter flow control valve 38 is located downstream of master outlet valves 32 and upstream of outlet 22 and is located in series with, and in fluid communication with, both master outlet valves 32 and outlet 22. Master meter flow control valve 38 can control a rate of fluid flow through master outlet valves 32 towards outlet 22. As an example, when proving a custody meter 12, a rate of flow through custody meter 12 that passes through master outlet valves 32 can be controlled with master meter flow control valve 38. Master meter outlet valve 40 can be located downstream of master outlet valves 32 and upstream of outlet 22 and in fluid communication with both master outlet valves 32 and outlet 22. Master meter outlet valve 40 can be opened to allow fluid flow from master outlet valves 32 to reach outlet 22 or closed to prevent fluid flow from master outlet valves 32 from reaching outlet 22.

Prover flow control valve 42 is located downstream of master prover valves 34 and upstream of outlet 22 and is located in series with master prover valves 34, outlet 22, and displacement prover 36. Prover flow control valve 42 is in fluid communication with master prover valves 34, displacement prover 36, and outlet 22. Prover flow control valve 42 can control a rate of fluid flow through master prover valves 34 towards outlet 22. As an example, when proving one of the master flow meters 28, a rate of flow through such master flow meter 28 that is being proved can be controlled with Prover flow control valve 42. As an example, the flow rate when proving one of the master flow meters 28 can generally be the custody meter 12 flow rate divided by number of master flow meters 28 to be used during proving of the custody meter 12. Prover flow control valve 42 can be adjusted to achieve such a flow rate through master flow meter 28 being proved.

Prover outlet valve 44 can be located downstream of master prover valves 34 and upstream of outlet 22 and is located in series with displacement prover 36. Prover outlet valve 44 is in fluid communication with master prover valves 34, displacement prover 36, and outlet 22. Prover outlet valve 44 can be opened to allow fluid flow from master prover valves 34 to reach outlet 22 or closed to prevent fluid flow from master prover valves 34 from reaching outlet 22.

Meter control system 46 can send and receive signals from all meters, valves, and provers of metering system 10. Meter control system 46 can communicate wirelessly or with wired technology with the meters, valves and provers of metering system 10. Signals from all meters, valves, provers and associated instruments such as pressure, temperature, and density sensors can be collected by meter control system 46 for performing proving calculations and determining meter factors. Metering control system 46 can also provide a user interface and allow for the operation of the valves of metering system, including performing valve interlock to avoid mismeasurement.

In an example of operation, looking at FIG. 1, during normal operating conditions metering skid 26 is being used to meter the flow of fluids and no proving is being undertaken. In such an operating condition, one or more of the outlet valves 18 are in an open position so that fluid flowing through associated custody meters 12 pass through outlet valves 18 and exit metering skid 26 by way of outlet 22. In the example embodiment of FIG. 1, first outlet valve 18a, second outlet valve 18b, and third outlet valve 18c are all in an open position so that fluid flowing through first custody meter 12a, second custody meter 12b, and third custody meter 12c exit the system by way of outlet 22. Each of first prover takeoff valve 20a, second prover takeoff valve 20b, and third prover takeoff valve 20c are in a closed position so that no fluids flowing through any of the custody meters 12 reach master meter bank 24.

In the example of FIG. 1, each of the master outlet valves 32, master prover valves 34, master meter outlet valve 40, prover outlet valve 44 are shown in a closed position. However, because each of the prover takeoff valves 20 are in a closed position, there is no fluid flow to any of the master outlet valves 32, master prover valves 34, master meter outlet valve 40 or prover outlet valve 44 and in alternate embodiments, one or more of the master outlet valves 32, master prover valves 34, master meter outlet valve 40, or prover outlet valve 44 could be in an open position.

Figure 2:
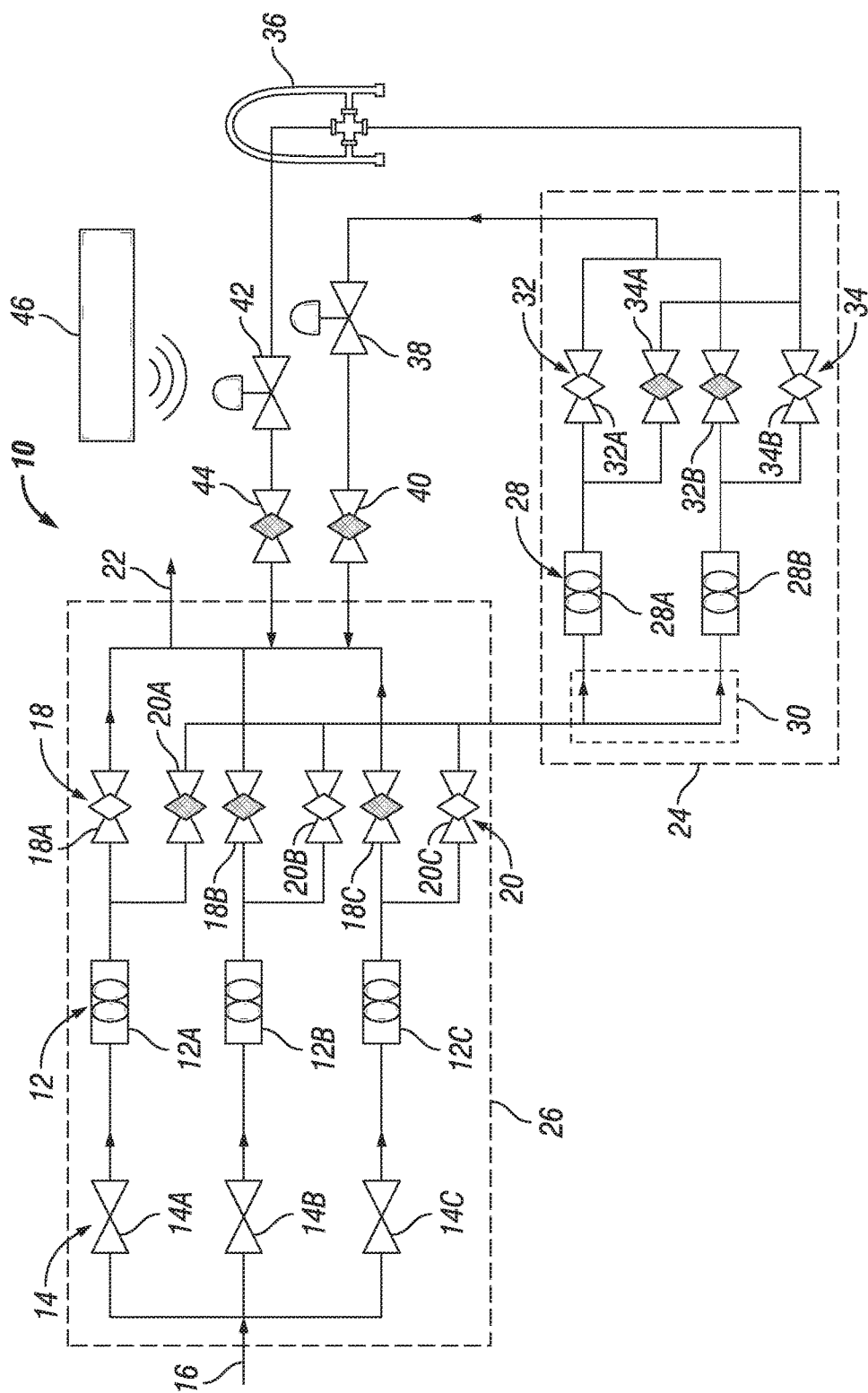
FIG. 2 is a schematic diagram of the system for verifying the accuracy of custody meters of FIG. 1, shown with the valves operated to prove first master meter before proving first custody meter.

Looking at FIG. 2, prover takeoff valve 20 that is associated with the custody meter 12 to be proved is operated to move to the open position and the outlet valve 18 associated with the same custody meter 12 is operated to move to the closed position. Fluids flowing through the custody meter 12 to be proved are therefore diverted to pass through master flow meters 28. In the example embodiments, fluids flowing through the custody meter 12 to be proved passes through first master flow meter 28a and second master flow meter 28b. In alternate embodiments, fluids flowing through the custody meter 12 to be proved passes through more than two master flow meters 28, however, fluids flowing through the custody meter 12 to be proved pass through at least two master flow meters 28.

In the example of FIG. 2, fluid flow through first custody meter 12a is diverted through open first prover takeoff valve 20a so that a portion of the fluid flow passes through each of the first master flow meter 28a and the second master flow meter 28b. First outlet valve 18a is in a closed position so that no fluid flowing through first custody meter 12a passes through first outlet valve 18a. Second prover takeoff valve 20b and third prover takeoff valve 20c are in a closed position so that fluids flowing through second custody meter 12b and third custody meter 12c pass through open second outlet valve 18b and open third outlet valve 18c, respectively.

Before proving first custody meter 12a, both of the master flow meters 28 are proved. Before proving either master flow meter 28, fluid flow from both master flow meters 28 are directed to outlet 22. In such an orientation, both master outlet valves 32 are in an open position and both master prover valves 34 are in a closed position. Master meter outlet valve 40 is also in an open position so that fluid flow from both master flow meters 28 can reach outlet 22. Master valves 32, 34 are then operated to switch fluid flow from each of the plurality of master flow meters 28 between outlet 22 and displacement prover 36 to prove each of the master flow meters 28 individually.

In the example of FIG. 2, first master flow meter 28a is being proved. In order to divert fluid flow from first master flow meter 28a to displacement prover 36, first master prover valve 34a is operated to move to an open position and then first master outlet valve 32a is operated to move to a closed position. Second master outlet valve 32b remains in an open position and second master prover valve 34b remains in a closed position so that fluid flowing through second master flow meter 28b is directed to outlet 22, bypassing displacement prover 36. Before operating first master prover valve 34a to move first master prover valve 34a to an open position, prover outlet valve 44 is operated to move to an open position so that fluid flowing through first master flow meter 28a can reach outlet 22 after passing through displacement prover 36.

In the example of FIG. 2, a portion of the fluid flow though first custody meter 12a is therefore passing through first master flow meter 28a and such fluid flow is being used during the operation of displacement prover 36 to prove first master flow meter 28a. Displacement prover 36 proves first master flow meter 28a by known techniques. When proving first master flow meter 28a, the rate of fluid flow through first master flow meter 28a can be controlled with prover flow control valve 42 located in series with the master flow meters 28 and displacement prover 36.

Master flow meters 28 can be proved at a plurality of selected flow rates. For example, if a custody meter 12 is to be proved at a single flow rate, master flow meters 28 should be proved at a corresponding single flow rate. However, if a custody meter 12 is to be proved at multiple flow rates, master flow meters 28 should be proved at corresponding multiple flow rates. A master meter factor at each rate of fluid flow can be determined for first master flow meter 28a by dividing the fluid flow measured by displacement prover 36 by the fluid flow measured by first master flow meter 28a during the proving operation. Meter control system 46 can gather data such as pressure, temperature, and can perform proving calculations and determine the meter factors.

Figure 3:
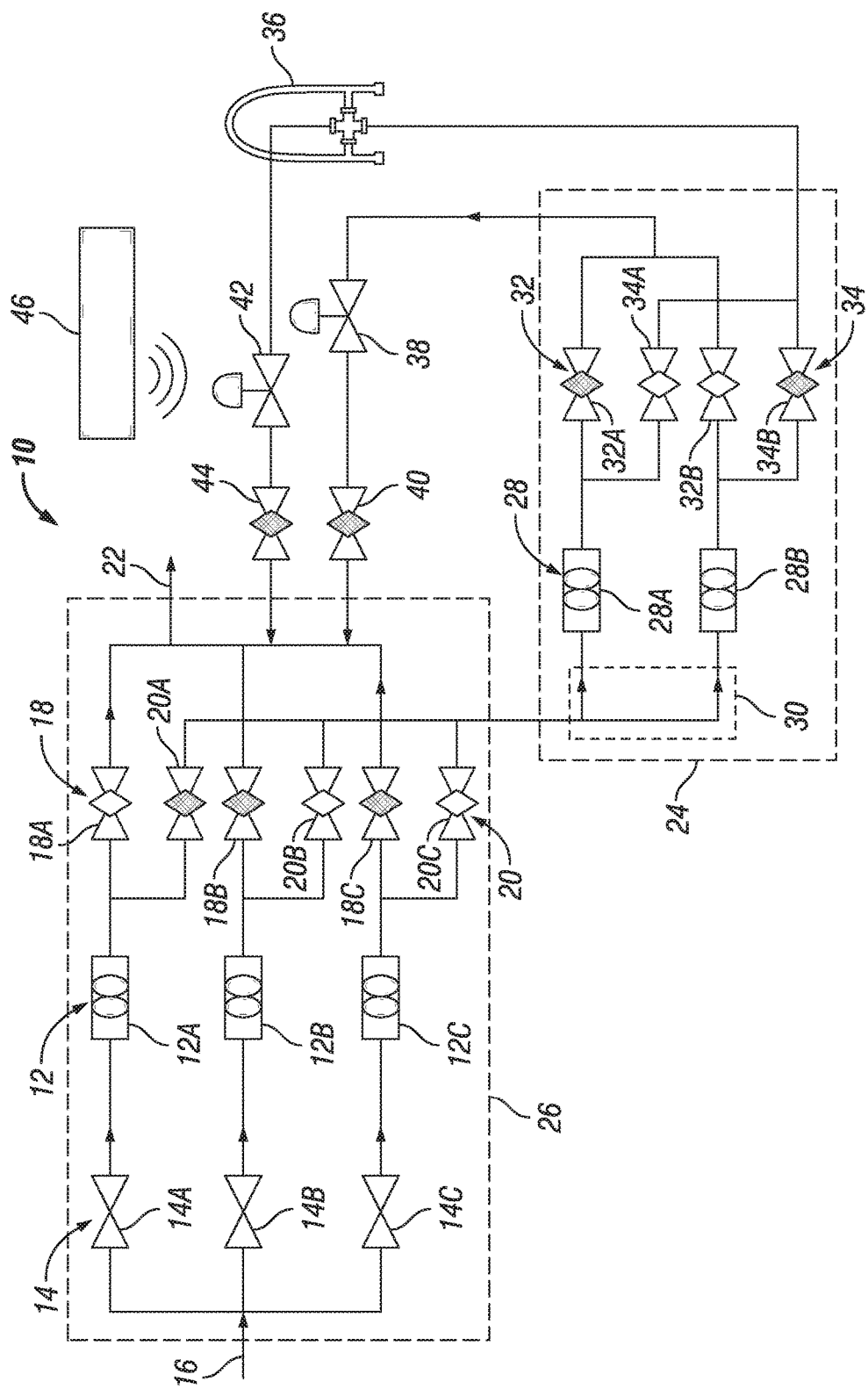
FIG. 3 is a schematic diagram of the system for verifying the accuracy of custody meters of FIG. 1, shown with the valves operated to prove second master meter before proving first custody meter.

Looking at FIG. 3, after proving first master flow meter 28a, second master flow meter 28b can next be proved. In order to prove second master flow meter 28b, first master outlet valve 32a is operated to move to an open position and then first master prover valve 34a is operated to move to a closed position. Second master prover valve 34b is operated to move to an open position and then second master outlet valve 32b is operated to move to a closed position.

In the example of FIG. 3, a portion of the fluid flow though first custody meter 12a is therefore passing through second master flow meter 28b and such fluid flow is being used during the operation of displacement prover 36 to prove second master flow meter 28b. Displacement prover 36 proves second master flow meter 28b by known techniques. When proving second master flow meter 28b, the rate of fluid flow through second master flow meter 28b can be controlled with prover flow control valve 42 located in series with the master flow meters 28 and displacement prover 36. A master meter factor at each rate of fluid flow can be determined for second master flow meter 28b by dividing the fluid flow measured by displacement prover 36 by the fluid flow measured by second master flow meter 28b during the proving operation.

Figure 4:
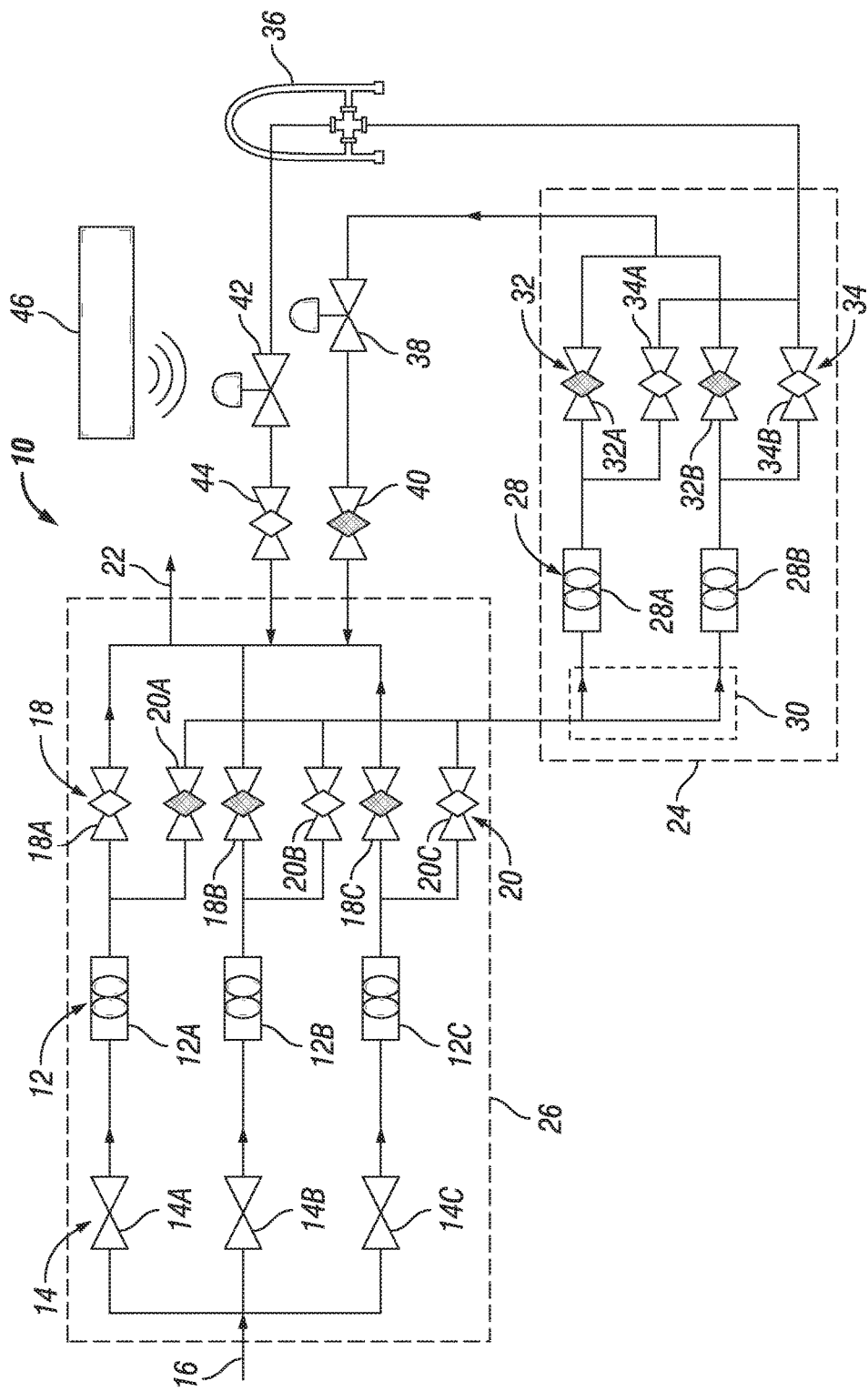
FIG. 4 is a schematic diagram of the system for verifying the accuracy of custody meters of FIG. 1, shown with the valves operated to prove first custody meter.

Looking at FIG. 4, after both first master flow meter 28a and second master flow meter 28b, and any additional master flow meters 28 are proved with displacement prover 36, first custody meter 12a can be proved with the use of the master flow meters 28 being utilized in simultaneously in parallel. In order to prove first custody meter 12a, second master outlet valve 32b is operated to move to an open position then second master prover valve 34b is operated to move to a closed position. First master outlet valve 32a is maintained in an open position and first master prover valve 34a is maintained in a closed position.

In the configuration of FIG. 4, fluid flow through first custody meter 12a is directed through both master flow meters 28 and the measured fluid flow through both master flow meters 28, as adjusted with the calculated master meter factors, can be summed and compared to the measured fluid flow through first custody meter 12a to prove first custody meter 12a. While proving first custody meter 12a, a rate of fluid flow through first custody meter 12a can be controlled with master meter flow control valve 38. First custody meter 12a is proved at multiple flow rates, or at a single flow rate, corresponding to the flow rates utilized to prove the master flow meters 28.

A custody meter factor for first custody meter 12a can be determined by dividing a sum total of the fluid flow measured by all of the master flow meters 28 being utilized, by the fluid flow measured by first custody meter 12a, for each flow rate. Meter control system 46 can gather data such as pressure, temperature, and can perform proving calculations and determine the meter factors.

In order to prove second custody meter 12b, first outlet valve 18a and second prover takeoff valve 20b can be operated to move to an open position and second outlet valve 18b and first prover takeoff valve 20a can be operated to move to a closed position so that fluid flow through first custody meter 12a is directed to outlet 22 and fluid flow through second custody meter is directed to master meter bank 24. Second custody meter 12b can then be proved as discussed above in relating to first custody meter 12a. The process can again be repeated to prove third custody meter 12c and any other additional custody meters in a similar manner. As process conditions vary, the process should be repeated to calculate new meter factors for both the master flow meters 28 and the custody meters 12.

Embodiments described herein therefore provide systems and methods for reducing the flow capacity of displacement prover 36 by using two or more master flow meters 28 in parallel to prove custody meters 12. As an example, if two master flow meters 28 are used (as shown), the flow capacity of displacement prover 36 will be half of the flow capacity of the displacement prover required if none or one master flow meter is used. As an alternate example, if three master meters are used, the flow capacity of the required displacement prover will be one-third the flow capacity of the displacement prover required if none or one master flow meter is used.

Using a small displacement prover 36 will allow for easier operation and maintenance of the displacement prover. Spare parts for displacement prover 36 and the handling of the components of the displacement prover would be easier. More venders stock and provide smaller sized displacement provers so better vendor services and competitive pricing would be expected. In addition, the smaller sized displacement prover 36 can be more easily accommodated in smaller spaces and a redundant displacement prover could be added to increase system availability.

Embodiments described herein, therefore, are well adapted to carry out the objects and attain the ends and advantages mentioned, as well as others inherent therein. While certain embodiments have been described for purposes of disclosure, numerous changes exist in the details of procedures for accomplishing the desired results. These and other similar modifications will readily suggest themselves to those skilled in the art, and are intended to be encompassed within the scope of the present disclosure disclosed herein and the scope of the appended claims.

What is claimed is:

1. A method for verifying the accuracy of a first custody meter having a first custody flow capacity with a displacement prover having a prover flow capacity, the method including:
   providing a first master flow meter and a second master flow meter, the first master flow meter and the second master flow meter each being arranged in series with the first custody meter and the first master flow meter being arranged in parallel with the second master flow meter;
   providing the displacement prover in series with the first master flow meter and the second master flow meter, wherein the prover flow capacity is less than the first custody flow capacity;
   diverting a fluid flow through the first custody meter so that a portion of the fluid flow passes through each of the first master flow meter and the second master flow meter;
   proving each of the first master flow meter and the second master flow meter individually with the displacement prover; and
   proving the first custody meter with both of the first master flow meter and the second master flow meter simultaneously.

2. The method of claim 1, further including determining a first custody meter factor by dividing a sum total of the fluid flow measured by the first master flow meter and the second master flow meter, by the fluid flow measured by the first custody meter.

3. The method of claim 1, further including:
   providing a second custody meter with a second custody flow capacity that is greater than the prover flow capacity;
   providing a third custody meter with a third custody flow capacity that is greater than the prover flow capacity;
   proving the second custody meter with both of the first master flow meter and the second master flow meter simultaneously; and
   proving the third custody meter with both of the first master flow meter and the second master flow meter simultaneously.

4. The method of claim 1, further including proving each of the first master flow meter and the second master flow meter at a plurality of selected flow rates, and proving the first custody meter at the plurality of selected flow rates.

5. The method of claim 1, wherein proving the first master flow meter includes controlling a rate of flow through the first master flow meter with a prover flow control valve located in series with the first master flow meter and the second master flow meter.

6. The method of claim 1, wherein proving the first custody meter includes controlling a rate of flow through the first custody meter with a master meter flow control valve located in series with the first master flow meter and the second master flow meter.

7. A method for verifying the accuracy of a plurality of custody meters with a displacement prover, the method including:
   providing a metering skid having the plurality of custody meters operating in parallel, each of the plurality of custody meters having a custody meter flow capacity;
   providing a master meter bank having a plurality of master flow meters, the plurality of master flow meters operating in parallel and being arranged in series with the plurality of custody meters;
   providing the displacement prover in series with the plurality of master flow meters, wherein a prover flow capacity is less than the custody meter flow capacity of each of the plurality of custody meters;
   operating prover takeoff valves to divert a fluid flow from a selected custody meter of the plurality of custody meters to the master meter bank and directing the fluid flow from the other of the plurality of custody meters to an outlet, wherein the fluid flow from the selected custody meter passes through two or more selected master flow meters of the plurality of master flow meters;

proving each of the selected master flow meters individually with the displacement prover; and proving the selected custody meter with a combination of the selected master flow meters simultaneously.

8. The method of claim 7, further including operating the prover takeoff valves to prove another custody meter of the plurality of custody meters with the combination of the selected master flow meters simultaneously.

9. The method of claim 7, further including operating master valves located in series with the plurality of master flow meters to switch the fluid flow from each of the plurality of master flow meters between the outlet and the displacement prover.

10. The method of claim 7, wherein proving each of the selected master flow meters includes controlling a rate of flow through the each of the selected master flow meters with a prover flow control valve located in series with each of the plurality of master flow meters.

11. The method of claim 7, wherein proving the selected custody meter includes controlling a rate of flow through the selected custody meter with a master meter flow control valve located in series with each of the plurality of master flow meters.

12. The method of claim 7, further including:

determining a master meter factor of each of the selected master flow meters by dividing the fluid flow measured by the displacement prover, by the fluid flow measured each of the selected master flow meters individually; and determining a custody meter factor of the selected custody meter by dividing a sum total of the fluid flow measured by all of the selected master flow meters, by the fluid flow measured by the selected custody meter.

13. The method of claim 7, further including providing a prover header located in series between the plurality of custody meters and the plurality of master flow meters, the prover header in fluid communication with each of the plurality of custody meters and each of the plurality of master flow meters.

14. A system for verifying the accuracy of a first custody meter having a first custody flow capacity with a displacement prover having a prover flow capacity, the system having:

a first master flow meter and a second master flow meter, the first master flow meter and the second master flow meter each being arranged in series with the first custody meter and the first master flow meter being arranged in parallel with the second master flow meter;

the displacement prover in series with the first master flow meter and the second master flow meter, wherein the prover flow capacity is less than the first custody flow capacity, the displacement prover operable to prove each of the first master flow meter and the second master flow meter individually; and prover takeoff valves operable to divert a fluid flow from the first custody meter so that a portion of the fluid flow passes through each of the first master flow meter and the second master flow meter for proving the first custody meter with both of the first master flow meter and the second master flow meter simultaneously.

15. The system of claim 14, further including a second custody meter with a second custody flow capacity that is greater than the prover flow capacity; and a third custody meter with a third custody flow capacity that is greater than the prover flow capacity; wherein the prover takeoff valves are operable to divert the fluid flow from the second custody meter so that a portion of the fluid flow passes through each of the first master flow meter and the second master flow meter for proving the second custody meter with both of the first master flow meter and the second master flow meter simultaneously; and the prover takeoff valves are operable to divert the fluid flow from the third custody meter so that a portion of the fluid flow passes through each of the first master flow meter and the second master flow meter for proving the third custody meter with both of the first master flow meter and the second master flow meter simultaneously.

16. The system of claim 14, further including a prover flow control valve located in series with the first master flow meter and the second master flow meter operable to control a rate of flow through the first master flow meter while proving the first master flow meter.

17. The system of claim 14, further including a master meter flow control valve located in series with the first master flow meter and the second master flow meter and operable to control a rate of flow through the first custody meter while proving the first custody meter.

18. The system of claim 14, further including a metering skid supporting the first custody meter and supporting additional custody flow meters.

19. The system of claim 18, providing a master meter bank having the first master flow meter and the second master flow meter.

20. The system of claim 19 further including a prover header located in series between the first custody meter and the first master flow meter and the second master flow meter, the prover header in fluid communication with each of the first custody meter, the first master flow meter and the second master flow meter.

* * * * *